(12) United States Patent
Oshima et al.

(10) Patent No.: US 6,628,432 B1
(45) Date of Patent: Sep. 30, 2003

(54) IMAGE READER AND IMAGE READING METHOD

(75) Inventors: Toshiaki Oshima, Nagano (JP); Chikashi Nakamura, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 09/432,424

(22) Filed: Nov. 2, 1999

(30) Foreign Application Priority Data

| Nov. 17, 1998 | (JP) | ............................................ 10-326818 |
| Apr. 1, 1999 | (JP) | ............................................ 11-094674 |
| Jul. 28, 1999 | (JP) | ............................................ 11-213637 |

(51) Int. Cl.[7] .............................. H04N 1/04; H04N 1/46; H04N 1/393; G02B 26/08
(52) U.S. Cl. ........................ 358/474; 358/487; 358/506; 358/496; 358/512; 358/498; 358/451; 359/196
(58) Field of Search ................................ 358/487, 506, 358/496, 512, 498, 451; 359/196

(56) References Cited

U.S. PATENT DOCUMENTS

| 4,278,999 A | * | 7/1981 | Ganguly et al. ............ 358/482 |
| 5,140,443 A | | 8/1992 | Iwahara et al. |
| 5,463,217 A | * | 10/1995 | Sobol et al. ................ 250/234 |
| 5,710,643 A | | 1/1998 | Depiano |
| 5,726,773 A | * | 3/1998 | Mehlo et al. ................ 358/474 |
| 5,814,809 A | | 9/1998 | Han |
| 6,169,611 B1 | * | 1/2001 | Brook et al. ................ 358/487 |

FOREIGN PATENT DOCUMENTS

| EP | 0 825 471 A2 | 2/1998 | |
| JP | 3-250967 | 11/1991 | ............ H04N/1/04 |
| JP | 5-122442 | 5/1993 | ............ H04N/1/04 |
| JP | 5-122451 | 5/1993 | ............ H04N/1/04 |
| JP | 5-130314 | 5/1993 | ............ H04N/1/00 |

* cited by examiner

Primary Examiner—Edward Coles
Assistant Examiner—Houshang Safaiour
(74) Attorney, Agent, or Firm—Sughrue Mion, PLLC

(57) ABSTRACT

An image reader is provided with a transparent member which is placed in an optical path from the surface of an original document bed on the side of a carriage to a condensing lens, whereby when the transparent member exists at a predetermined position, the condensing lens can be focused on a translucent original existing at a position above the position of a reflection original. When the transparent member is at a second predetermined position, the condensing lens can be focused on the reflection original. The condensing lens can be focused on more than one position simply by placing the transparent member in the optical path, so that the structure is simple and the manufacturing costs can be reduced.

13 Claims, 7 Drawing Sheets

IMAGE READER AND IMAGE READING METHOD

BACKGROUND OF THE INVENTION

1. Technical Field of the Invention

This invention relates to an image reader and an image reading method.

In particular, this invention is directed to a movable transparent member for improving the focusing of reflection and translucent originals.

2. Description of the Related Art

One type of image reader for reading an original of an image, text, etc., is a flat bed type comprising an original document bed made of a transparent plate of glass, etc., placed on the top of a box-type cabinet. A drive moves a carriage in parallel with the original document bed and the carriage is placed in the cabinet. A light source for reading an opaque (reflection) original, such as paper, and a line sensor comprising an arrangement of a large number of photoelectric conversion elements, are mounted on the carriage. Application light of the light source on the carriage is reflected on the surface of the original on the original document bed and is gathered through a condensing lens on the line sensor.

When an original is read, light is applied from the light source to the original placed on the original document bed and the reflected light from the original is gathered through the condensing lens on the line sensor. While the carriage is moved in a direction perpendicular to the arrangement of the elements of the line sensor and in parallel with the original face, light and shade are detected and are converted into an electric signal. In such an image reader, to read an original in a wide range at high resolution by a small-sized line sensor and miniaturize the whole reader, it is a common practice to reflect light from the original by a number of mirrors placed on a carriage and guide the reflected light into a condensing lens, thereby enlarging an optical path length.

A surface light source is placed above the original document bed and light applied from the surface light source and passed through an original is read by the line sensor on the carriage, whereby a translucent original such as a film can also be read.

However, an image reader for both reflection and translucent originals generally is provided by adding a light source for translucent originals to an image reader for reflection originals, thus, the focus of a condensing lens of a carriage is set so as to match a reflection original. For the reflection original, distance $D_R$, the distance from the surface of an original document bed 3 on the original side thereof to an original 51, is 0.3 mm to 0.4 mm, as shown in FIG. 6. Therefore, the focus of the condensing lens of the carriage is set so as to match a position shifted about 0.3 mm to the original side from the original document bed 3. In this case, the focus depth of the condensing lens is about ±0.5 mm, thus focus is obtained if the distance from the surface of the original document bed 3 on the original side thereof is in the range of 0 to 0.8 mm or so.

In contrast, if the original is a translucent original 52 such as a positive film as shown in FIG. 7, the translucent original 52 is stored in a film holder 53 and is further stored in a folder cartridge 54 of an image reader 1, thus distance $D_P$ from the surface of the original document bed 3 on the original side thereof to the original 52 becomes about 2.5 mm. Therefore, focus on the translucent original 52 cannot be obtained with the condensing lens focusing on reflection originals; thus, the original is read in a state in which it is slightly out of focus.

However, recently the performance of an image reader has improved to have a resolution of 600 dpi, 1200 dpi, or more; thus the resolution of the image reader is affected by a slight out-of-focus phenomenon.

To remove the out-of-focus condition caused by different original positions, an image reader is used wherein either or both of a photosensor and a condensing lens placed on a carriage and a cabinet are moved in the optical axis direction, whereby the position of the focus of the condensing lens or the optical path length from an original to the condensing lens can be changed seamlessly for always focusing on the original; however, the structure of the image reader is complicated and manufacturing costs are increased.

SUMMARY OF THE INVENTION

It is therefore a main object of the invention to provide an image reader and an image reading method capable of focusing a lens on more than one position.

It is another object of the invention to provide an image reader and an image reading method capable of providing a simple structure and reduced manufacturing costs.

According to the invention, an image reader has a transparent member placed so that the transparent member can be inserted into an optical path on which light from an original travels. Thus, the lens focus position when the transparent member exists on the optical path differs from that when the transparent member does not exist on the optical path. Therefore, the lens can be focused on more than one position, so that if the position of an original placed on an original document bed changes, the lens can be focused on the original. Since the transparent member is simply placed in the optical path, the structure is simple and the manufacturing costs can be reduced.

Since the transparent member is placed in the optical path between the original document bed and the lens, the transparent member does not require high accuracy as compared with the case where the transparent member is placed in the optical path between the lens and a photosensor, for example.

Therefore, the transparent member is easily manufactured and the manufacturing costs can be reduced.

Also, the transparent member may be placed in the proximity of the original document bed. Thus, the transparent member can be placed in the portion with a small optical path width in the perpendicular direction to the light travel direction.

Therefore, the transparent member can be miniaturized and the manufacturing costs can be reduced.

Also, the transparent member may be shaped like a plate, so as to have a smooth surface and uniform thickness. Thus, irregular reflection on the surface of the transparent member is prevented and rectilinear propagation of light can be provided, and if the transparent member is inserted into the optical path, necessary resolution can be provided. Since the shape of the transparent member is simple, work is easy and the manufacturing costs can be reduced.

The transparent member may have antireflection means. The antireflection means prevents light passing through the transparent member from being reflected on the surface and the rear face of the transparent member. Therefore, occurrence of a ghost can be prevented. (The ghost means that light from an original is reflected on the surface or the rear face of the transparent member and the original is read as if another image existed at a position different from the position corresponding to the actual image.)

Also, the transparent member is not inserted into the optical path when light reflected on the surface of the original is read. Thus, for example, if the optical path length when light passing through the original is read differs from that when light reflected on the surface of the original is read and the focus position of the condensing lens differs, the lens can be focused on the original if the position of the original placed on the original document bed changes.

According to the image reading method of the invention, to read a translucent original allowing light to pass through, such as a negative film or a positive film, light is applied from above the translucent original, namely, from the side opposite to the photosensor with the original document bed between, and light passing through the translucent original can be read. When a translucent original is read, the transparent member is inserted into the optical path. Therefore, for example, not only light from a reflection original reflected on the surface of the original placed on the original document bed, but also the translucent original placed above the original document bed, can be read. The transparent member is inserted into the optical path, whereby if the position of an original placed on the original document bed changes depending on whether the original is a reflection original or a translucent original, the lens can be focused on the original.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE PREFERRED EMBODIMENTS

Referring now to the accompanying drawings, there are described preferred embodiments of the invention.

First Embodiment

Figure 3:
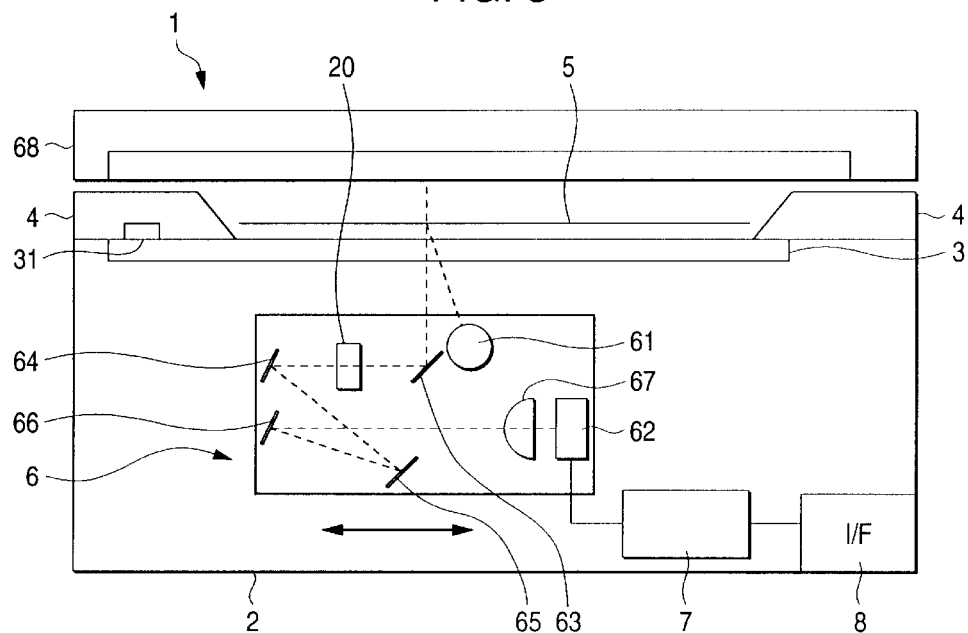
FIG. 3 is a schematic diagram to show the image reader according to the first embodiment of the invention.

FIG. 3 shows a schematic structure of an image reader 1 of flat bed type with a moving carriage according to a first embodiment of the invention.

An original document bed 3 made of a transparent plate of glass, etc., is placed on the top of a box-type cabinet 2. The cabinet 2 contains a carriage 6 that can be reciprocated by a drive (not shown) in parallel to an original 5 placed on the original document bed 3.

Figure 1:
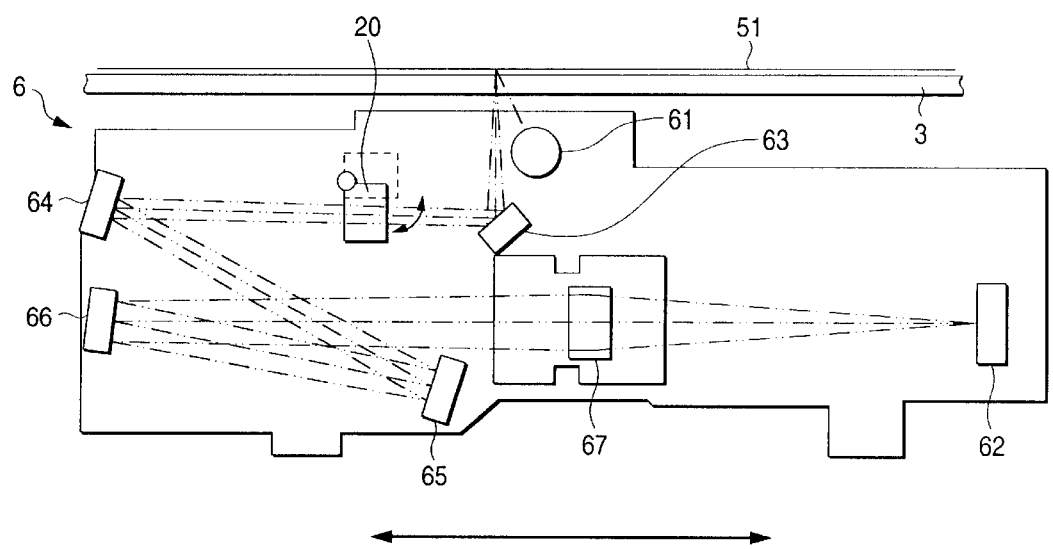
FIG. 1 is a schematic drawing of a carriage of an image reader according to a first embodiment of the invention when the carriage is viewed from a lateral direction with respect to a moving direction.
Figure 2:
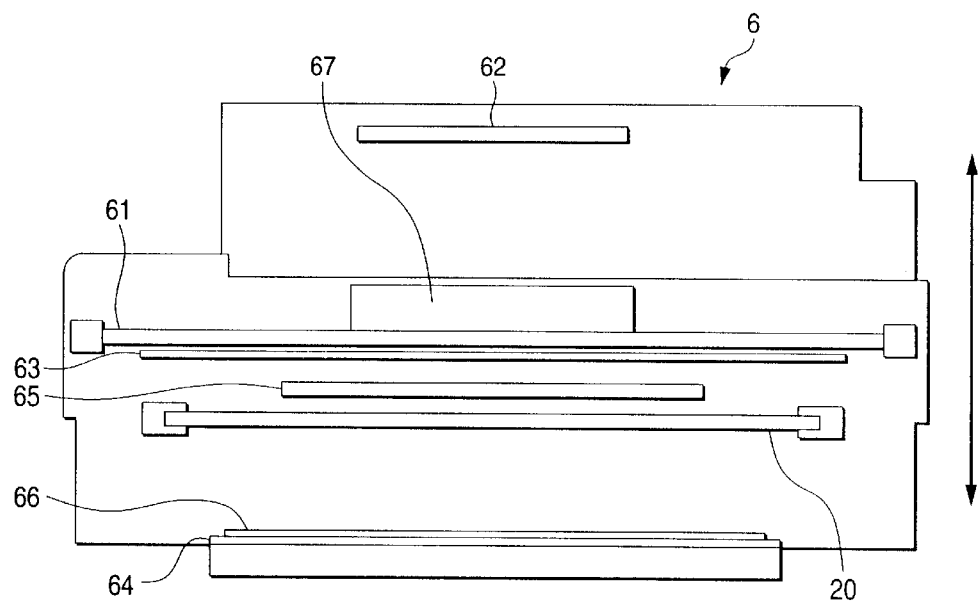
FIG. 2 is a schematic drawing of the carriage of the image reader according to the first embodiment of the invention when the carriage is viewed from an upward direction with respect to the moving direction.

FIGS. 1 and 2 show the carriage 6 of the image reader 1 of the first embodiment. FIG. 1 is a drawing of the carriage viewed from the side with respect to the moving direction of the carriage 6 and FIG. 2 is a drawing of the carriage 6 viewed from the original document bed 3. The arrow denotes the moving direction of the carriage 6.

A light source 61 and a line sensor 62 as a photosensor are mounted on the carriage 6. Application light of the light source 61 is reflected on the surface of an original 5 and is reflected by mirrors 63, 64, 65, and 66, then is gathered through a condensing lens 67 on the line sensor 62. In the first embodiment, light from the original 5 is reflected in the order of the mirrors 63, 64, 65, and 66, namely, is reflected by the four mirrors four times for enlarging the optical path length from the original 5 to the condensing lens 67.

Figure 6:
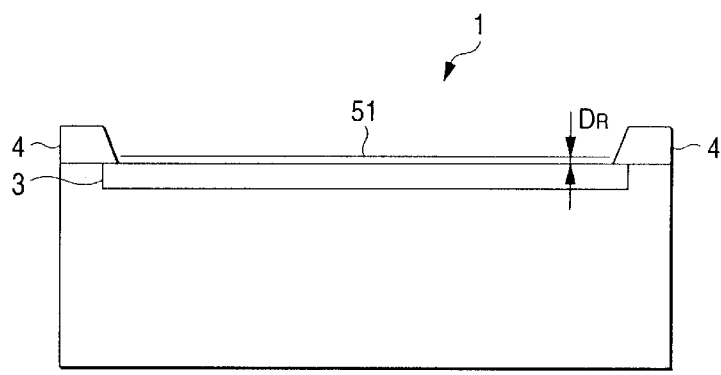
FIG. 6 is a schematic diagram to show a state in which a reflection original is placed on an original document bed of the image reader.
Figure 7:
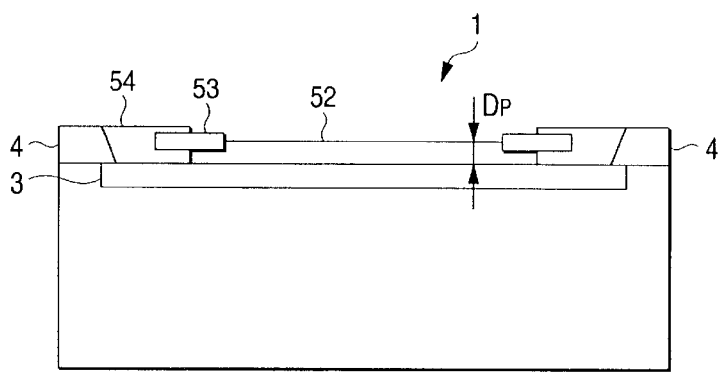
FIG. 7 is a schematic diagram to show a state in which a translucent original is placed on the original document bed of the image reader.

As the original 5, a reflection original 51 of paper, etc., can be used as shown in FIG. 6 and a translucent original 52 of a positive film, a negative film, etc., can be used as shown in FIG. 7. To simplify the description, the original 5 described throughout the specification contains both the reflection original 51 and the translucent original 52.

Figure 8:
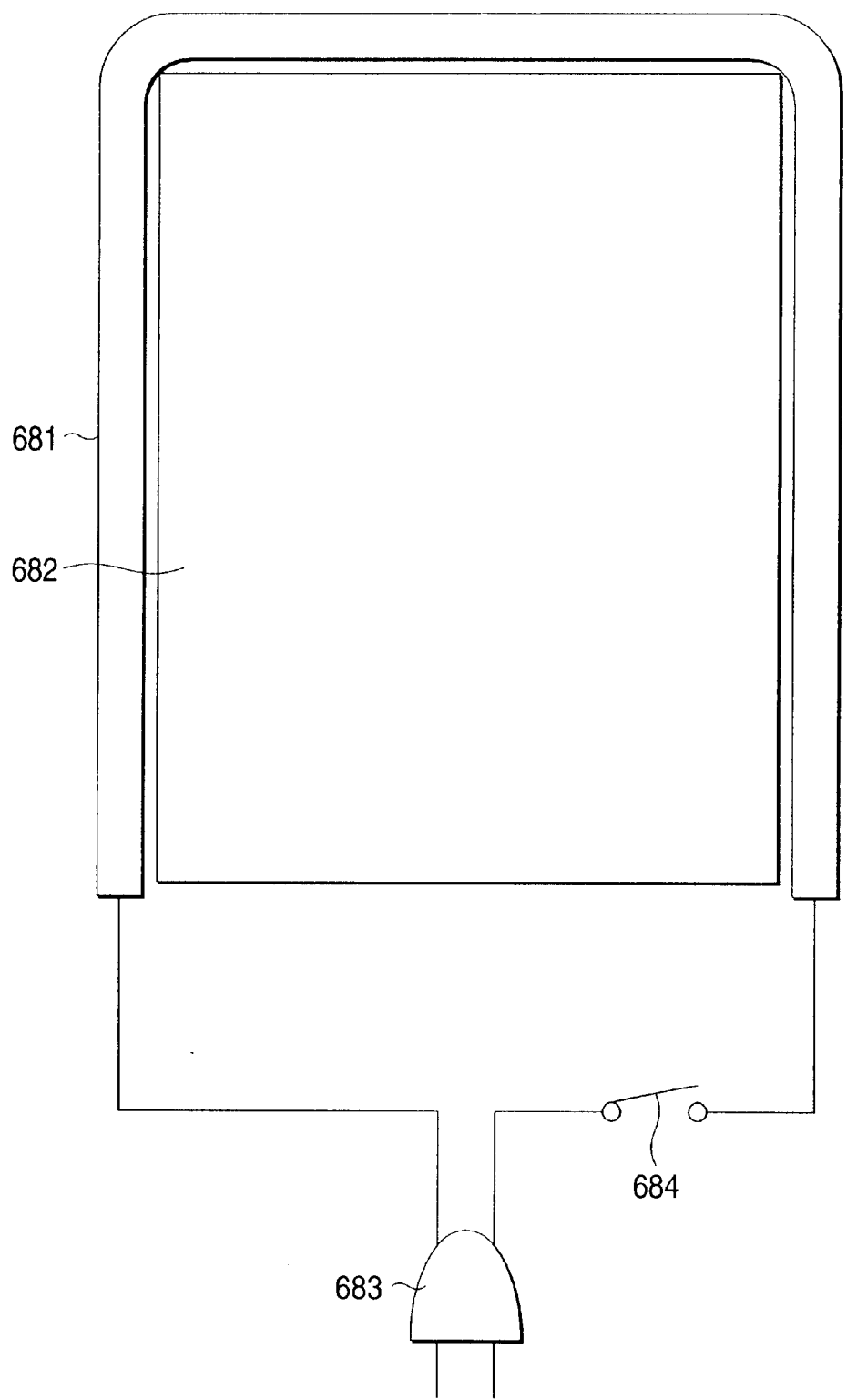
FIG. 8 is a schematic drawing to show a surface light source of the image reader according to the first embodiment of the invention.

As shown in FIG. 2, the light source 61 is placed in a direction perpendicular to the moving direction of the carriage 6 and uses a fluorescent lamp, etc. A surface light source 68 is placed above the original document bed 3. As shown in FIG. 8, light applied from a fluorescent lamp 681 is reflected on grooves unevenly spaced from each other, made in a light guide plate 682, whereby the light can be applied to the side of the original document bed 3 as uniform light. The surface light source 68 has a power receptacle 683 connected to a power supply placed in the cabinet 2 and a switch 684 of the fluorescent lamp 681 is turned on or off through a control section 15 as the user gives a command to a personal computer or the image reader 1.

A charge-storage photosensor is used as the line sensor 62 and comprises a plurality of elements such as CCD arranged linearly in the direction perpendicular to the move direction of the carriage 6. The original document bed 3 is surrounded by an original document guide 4 for regulating a move of the original 5 when the original is read. A white reference 31 having a uniform reflection surface of a high reflection factor is placed in the end part of the original document bed 3 in the moving direction of the carriage 6.

Figure 4:
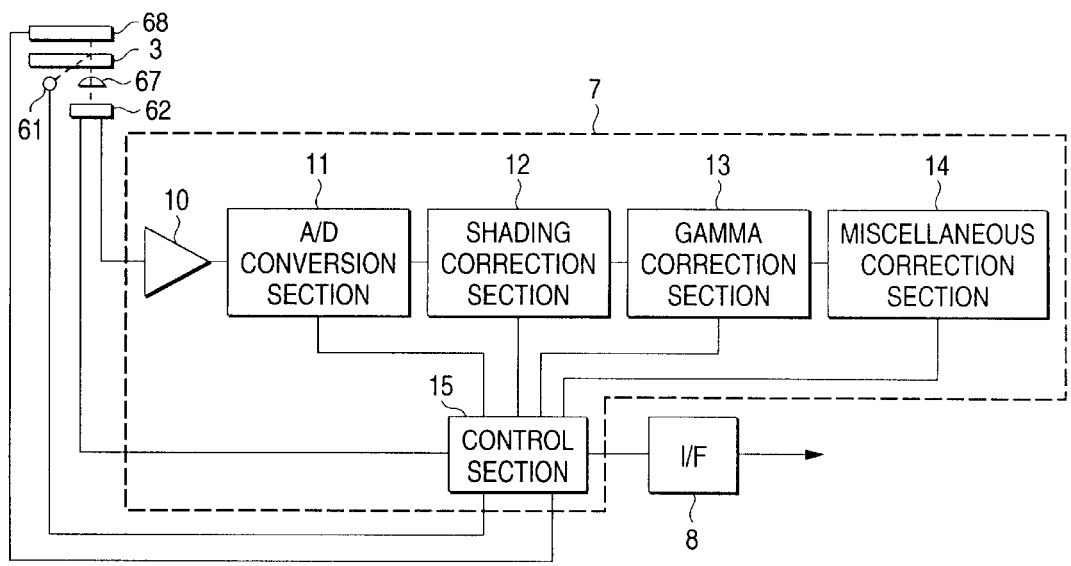
FIG. 4 is a block diagram to show the image reader according to the first embodiment of the invention.

Charges are accumulated in the amount responsive to the quantity of light gathered on the elements of the line sensor 62, and the accumulated charges are processed by a signal processor 7 as shown in FIG. 4. An A/D conversion section 11 converts analog data input from the line sensor 62 through an amplifier 10 into a digital signal and passes the digital signal to a shading correction section 12. The shading correction section 12 uses read data of the white reference 31 before reading starts and corrects variations in the sensitivity of each element of the line sensor 62 and variations in the light quantity of the light source 61 in the main scanning direction thereof. A gamma correction section 13 makes a gamma correction based on a predetermined gamma function and converts the light quantity signal output from the shading correction section 12 into an image signal. A miscellaneous correction section 14 executes various types of conversion such as color correction, edge enhancement, and area enlargement/reduction (scaling).

The control section 15, which is made of a microcomputer consisting of a CPU, RAM, ROM, etc., controls the whole image reader 1 and is connected via an interface 8 to an external image processing system (not shown), such as a personal computer.

A transparent member 20 is placed between the mirrors 63 and 64 of the carriage 6. It is made of glass, such as silicate glass, and is shaped like a plate and is ground so as to become smooth on the surface and constant in plate thickness.

The transparent member 20 is placed between the mirrors 63 and 64, whereby the length of the transparent member 20 in a perpendicular direction to the travel direction of light can be lessened as shown in FIG. 1, so that the transparent member 20 can be miniaturized. The transparent member 20 is turned like the arrow shown in FIG. 1 by a drive (not shown).

Therefore, when the reflection original 51, such as paper, is read as shown in FIG. 6, the transparent member 20 is moved to the position (second predetermined position) indicated by the dashed line in FIG. 1; when the translucent original 52, such as a film, is read as shown in FIG. 7, the transparent member 20 is moved to the position (first predetermined position) indicated by the solid line in FIG. 1. It is moved in accordance with instruction means, such as a switch (not shown), placed on the image reader 1 or as the user gives a command to a personal computer, etc., connected to the image reader 1.

To use the personal computer to give a command to the image reader 1, the image reader 1 is controlled by software of a scanner driver, etc., such as TWAIN, installed in the personal computer. If the user selects reading of a translucent original on the TWAIN in the personal computer, the transparent member 20 is inserted into the optical path in response to the translucent original selection command. Even if the translucent original 52 as shown in FIG. 7 is read, it may be placed directly on the original document bed 3 without using the film holder 53. If the film holder 53 is not used, the user can select a noninsertion command of the transparent member 20 on the TWAIN. If the noninsertion command is selected, the transparent member 20 is not inserted into the optical path, or is retracted from the optical path. Next, the transparent member 20 will be discussed in more detail.

Figure 5:
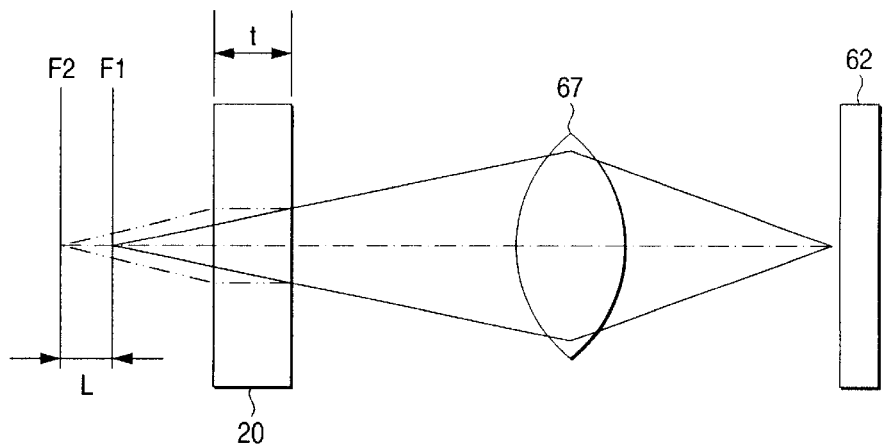
FIG. 5 is a schematic representation to show the relationship between the focus of a condensing lens and a transparent member.

If the transparent member 20, such as glass, is inserted into the optical path until light from the original 5 is incident on the condensing lens 67 as shown in FIG. 5, focus F1 of the condensing lens 67 moves to focus F2. In this case, moving distance L of the focus position from the focus F1 to focus F2 is shown in the following expression (1):

$$L = (1 - 1/n) \times t \quad (1)$$

where n denotes the refractive index of the transparent member and t denotes the thickness of the transparent member in the optical path direction thereof.

The silicate glass used in the first embodiment has a refractive index n=1.5. Setting the focus moving distance, namely, the distance from the reflection original position to the translucent original position to L=2.5 mm, the thickness t of the transparent member 20 needs to be 7.5 mm, from expression (1) mentioned above.

Therefore, in the first embodiment, silicate glass which is 7.8 mm thick is ground to the thickness 7.5 mm so as to become smooth on the surface for use as the transparent member 20. The length in the perpendicular direction to the light travel direction is 12 mm. If the transparent member 20 of a 7.5 mm thickness is used, the focus depth of the condensing lens 67 is ±0.5 mm, thus, the focus of the condensing lens 67 is obtained in the range of 2.0 mm to 3.0 mm as the distance from the surface of the original document bed 3 on the original 5 side thereof.

Next, the operation of the described image reader 1 will be discussed.

First, the user connects a personal computer (not shown) to the interface 8 of the image reader 1, places an original 5 on the original document bed 3, and specifies the read range and read resolution from the personal computer, then gives a read execution command. At this time, the user also specifies whether the original to be read is a reflection or translucent original. Software such as TWAIN is started in the personal computer and the user gives a command to the image reader 1 from the software. For example, if the user selects a translucent original, the transparent member 20 is automatically inserted. However, to read a translucent original, the film holder is not always used as described above, thus noninsertion of the transparent member 20 can be selected as required.

Second, when the read execution command is entered, the control section 15 turns on the light source 61 or the surface light source 68 and moves the carriage 6 to the read line positions in sequence at constant speed, whereby charges (signal charges) are accumulated in the line sensor 62 in the amount proportional to the reflection factor (light and shade) or transmission factor of the original 5 at each read line position.

Third, the charges accumulated in the line sensor 62 are output to the amplifier 10 after the expiration of a predetermined time, and the line sensor 62 is moved to the next read line position.

Fourth, an output signal from the amplifier 10 is converted into digital light quantity signal data by the A/D conversion section 11 and the digital data is subjected to various corrections in the shading correction section 12, the gamma correction section 13, and the miscellaneous correction section 14, then is output via the interface 8 to the personal computer, etc.

Next, while the carriage 6 is moved at constant speed, the second through fourth steps described above are repeated on each read line, whereby the image in the specified range is output to the personal computer, etc.

As described above, in the first embodiment, the transparent member 20 is provided, that can be inserted into or retracted from the optical path from the surface of the original document bed 3 on the carriage 6 side to the condensing lens 67, whereby the condensing lens 67 can be focused on the reflection original and the translucent original. The condensing lens 67 can also be focused on more than one position simply by providing the transparent member 20 that can be inserted into or retracted from the optical path, so that the structure is simple and the manufacturing costs can be reduced.

Second Embodiment

Figure 9:
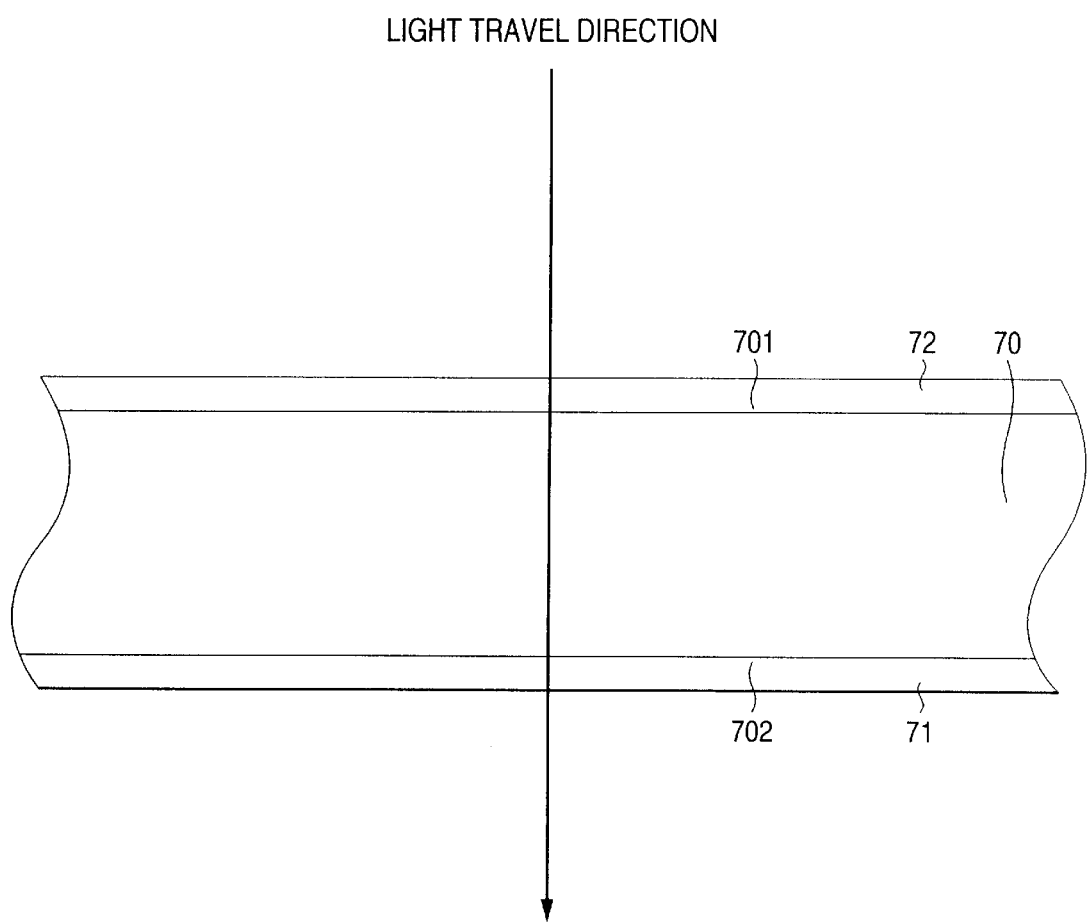
FIG. 9 is a schematic diagram to show a transparent member of an image reader according to a second embodiment of the invention.

A second embodiment of the invention has the same configuration as the first embodiment except that a transparent member has antireflection means, as shown in FIG. 9.

Nonreflection coatings 71 and 72 as antireflection means are applied to a surface 701 and a rear face 702 of a transparent member 70 with respect to the light travel direction thereof. For example, such a multilayer film coating as applied to a lens of a camera is used as the nonreflection coating 71, 72. The nonreflection coatings 71 and 72 prevent light from an original 5 passing through the transparent member 70 from being reflected on the surface 701 and the rear face 702 of the transparent member 70.

Figure 10:
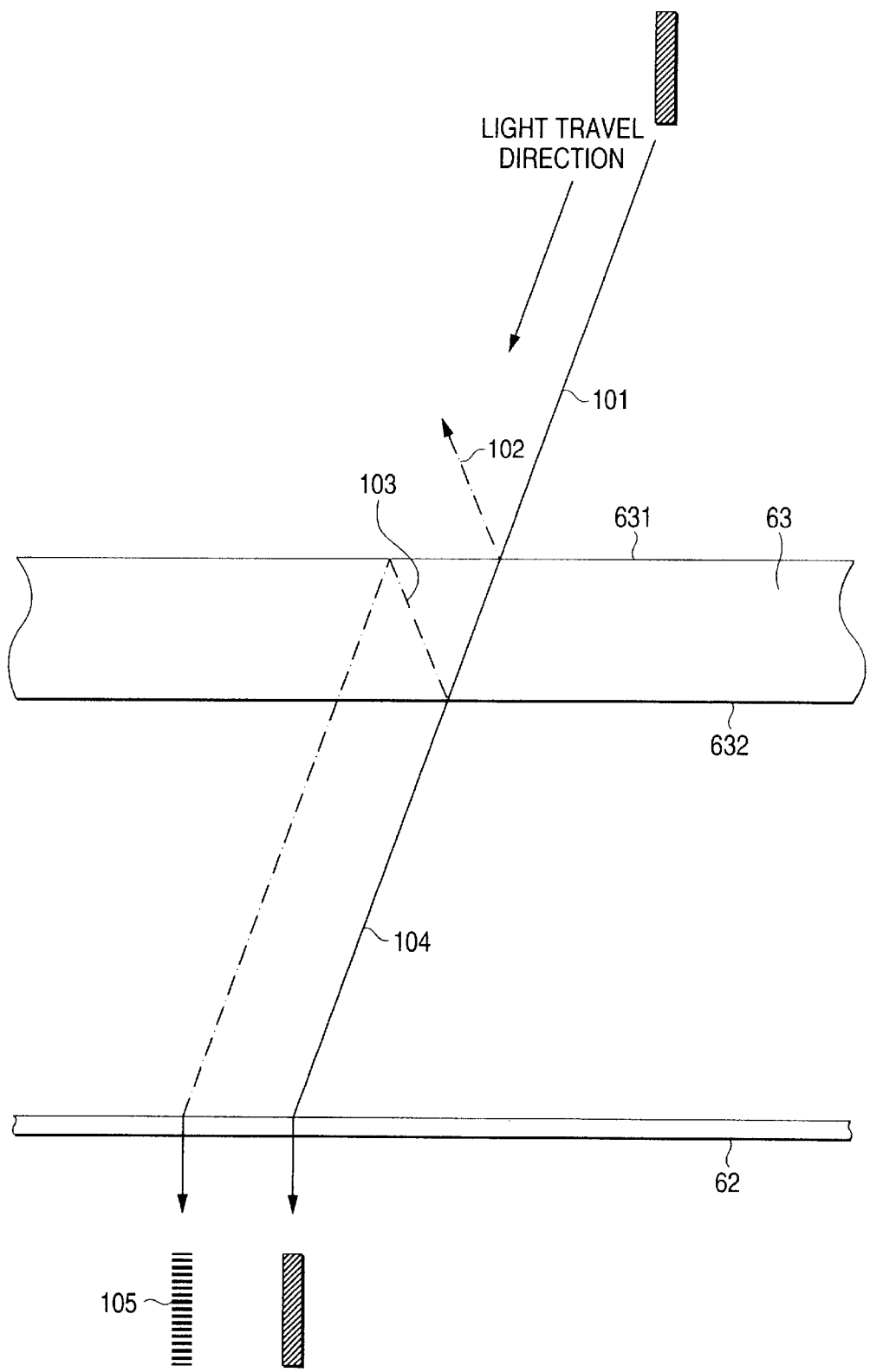
FIG. 10 describes the reflection of light passing through a transparent member.

Light 101 from an original passing through a transparent member 63 is reflected on a surface 631 and a rear face 632 of the transparent member 63 to which a nonreflection coating is not applied with respect to the light travel direction thereof, as shown in FIG. 10. Light 102 reflected on the surface of the transparent member 63 scarcely interferes with the light 101 from the original and has a small effect on the reading of the original. On the other hand, light 103 reflected on the rear face 632 of the transparent member 63 is further reflected on the inside of the surface 631 of the transparent member 63 and travels toward a photosensor 62. Resultantly, the reflected light 103 and light 104 not reflected and passing through the transparent member 63 differ in optical path and differ in incident position on the photosensor 62, as shown in FIG. 10. Thus, it is feared that a ghost 105 may appear, interfering with clear reading of the original. This phenomenon occurs noticeably as the transparent member 63 becomes thicker.

In view of the foregoing, the nonreflection coatings 71 and 72 may be applied to the transparent member 70 as shown in FIG. 9, whereby light is prevented from being reflected on the surface 701 and the rear face 702 of the transparent member 70. In the second embodiment, the nonreflection coatings 71 and 72 are applied to the transparent member 70, whereby the ghost 105, which would otherwise occur because of insertion of the transparent member into the optical path, is prevented. Therefore, the original can be read more clearly.

Third Embodiment

A third embodiment of the invention will be discussed with reference to FIG. 11. Parts identical with or similar to those in the first and second embodiments previously described are denoted by the same reference numerals in FIG. 11 and will not be discussed again.

In the first and second embodiments, the image reader of flat bed type with a moving carriage incorporating the transparent member of the invention has been described. In the third embodiment, an image reader of flat bed type with moving mirrors incorporating the transparent member of the invention will be discussed.

An image reader 1 has a first carriage 91 and a second carriage 92 in a cabinet 2. The first carriage 91 is provided with a light source 911 for reflection originals, a mirror 912, and a transparent member 20. The transparent member described in the first or second embodiment can be applied as the transparent member 20. The second carriage 92 is provided with mirrors 921 and 922.

Light applied from the light source 911 or a surface light source 68 is reflected on an original 5 or passes through the original 5 and is reflected on the mirrors 912, 921, and 922. The light reflected on the mirrors 912, 921, and 922 is gathered through a condensing lens 93 on a line sensor 94 and is converted into an electric signal by the line sensor 94.

Figure 11:
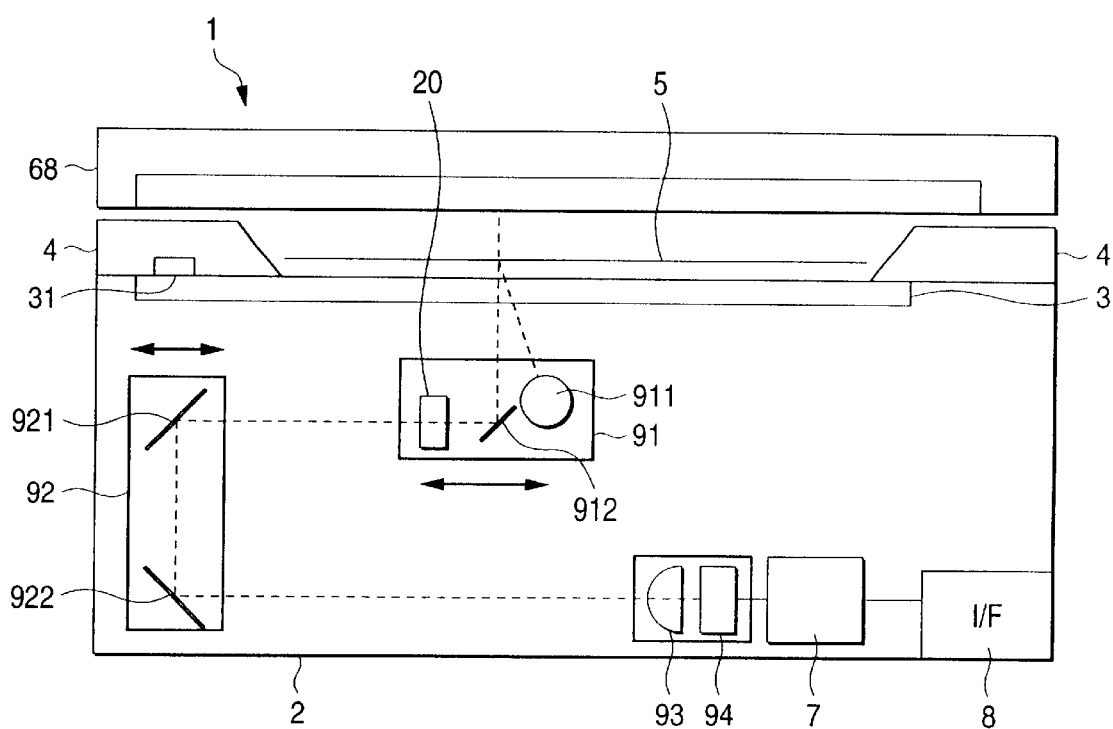
FIG. 11 is a schematic diagram to show an image reader according to a third embodiment of the invention.

The first carriage 91 and the second carriage 92 can be moved separately in the direction indicated by the arrow in FIG. 11. The first carriage 91 and the second carriage 92 are moved separately, whereby the distance from the mirror 912 to the mirror 921 and that from the mirror 922 to the condensing lens 93 can be changed whenever necessary. Thus, the optical path length from the original 5 to the condensing lens 93 is changed, so that it is made possible to focus the condensing lens 93 on the original 5 with high accuracy.

Further, the first carriage 91 is provided with the transparent member 20. Thus, if the distance from an original document bed 3 to the original 5 varies depending on a reflection original or a translucent original, the condensing lens 93 can also be focused on the original 5 with high accuracy.

In the third embodiment, the image reader of flat bed type with moving mirrors incorporates the transparent member of the invention, whereby if the resolution of the image reader is enhanced to more than the former resolution, for example, to 1600 dpi or more, originals can be read with high accuracy.

In the embodiments, the transparent member made of silicate glass is applied to the image reader of the invention; a transparent resin, glass, etc., having a large refractive index is applied to the invention, whereby the transparent member can be thinned and the carriage can be more miniaturized.

Although only one transparent member is shown in the optical path, more than one transparent member can be placed in the optical path so as to focus the condensing lens on a larger number of positions.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention includes all embodiments falling within the scope of the appended claims.

What is claimed is:

1. An image reader comprising:

an original document bed for placing an original;

a light source for applying light to the original;

a lens for gathering light including at least one of a light reflected from the original and a light passing through the original a photosensor for converting the light gathered through said lens into an electric signal; and a transparent member positioned so as to be insertable into an optical path from said original document bed to said lens.

2. The image reader as claimed in claim 1, wherein said transparent member is disposed in proximity to said original document bed.

3. The image reader as claimed in claim 1, wherein said transparent member is plate-shaped with a smooth surface and uniform thickness.

4. The image reader as claimed in claim 1, wherein said transparent member has antireflection means for preventing reflection of light passing therethrough.

5. The image reader as claimed in claim 1, wherein said transparent member is retracted out of the optical path when a reflection original is being read.

6. An image reading method for an image reader having an original document bed for placing an original, a light source for applying light to the original, a lens for gathering light including at least one of a light reflected from the original and a light passing through the original, a photosensor for converting the light gathered through the lens into an electric signal, and a transparent member positioned so as to be insertable into an optical path from the original document bed to the lens, said image reading method comprising:

placing a translucent original above the original document bed;

inserting the transparent member into the optical path; and applying light from the light source from above the translucent original.

7. The image reader as claimed in claim 2, wherein said transparent member is plate-shaped having a smooth surface and uniform thickness.

8. The image reader as claimed in claim 7, wherein said transparent member has antireflection means for preventing reflection of light passing therethrough.

9. The image reader as claimed in claim 8, wherein said transparent member is retracted out of the optical path when a reflection original is being read.

10. The image reader as claimed in claim 1, further comprising a plurality of transparent members.

11. The image reader as claimed in claim 1, wherein said transparent member has a non-reflection coating for preventing reflection of light passing therethrough.

12. The image reader as claimed in claim 1, wherein said transparent member has a high refractive index.

13. The image reading method of claim 6, wherein the transparent member is retracted out of the optical path when a reflection original is being read.

* * * * *